US012258801B2

(12) United States Patent
Roesner et al.

(10) Patent No.: US 12,258,801 B2
(45) Date of Patent: Mar. 25, 2025

(54) OFFSET ROLLER CARRIER AND BOTTOM BRACKET ASSEMBLY

(71) Applicant: Assa Abloy Entrance Systems AB, Landskrona (SE)

(72) Inventors: Stephen Anthony Roesner, Lawrence, KS (US); Joshua Dombrosky, Advance, NC (US)

(73) Assignee: Assa Abloy Entrance Systems AB, Landskrona (SE)

( * ) Notice: Subject to any disclaimer, the term of this patent is extended or adjusted under 35 U.S.C. 154(b) by 548 days.

(21) Appl. No.: 17/365,319

(22) Filed: Jul. 1, 2021

(65) Prior Publication Data

US 2023/0003065 A1 Jan. 5, 2023

(51) Int. Cl.

*E05D 15/16* (2006.01)
*E06B 3/48* (2006.01)
*E06B 1/52* (2006.01)

(52) U.S. Cl.

CPC ............ *E05D 15/165* (2013.01); *E06B 3/485* (2013.01); *E05Y 2201/654* (2013.01); *E05Y 2201/688* (2013.01); *E05Y 2600/626* (2013.01); *E05Y 2900/106* (2013.01); *E06B 1/522* (2013.01)

(58) Field of Classification Search

CPC ....... E05D 15/165; E05D 15/26; E05D 15/22; E06B 3/485; E06B 1/522; E05Y 2201/654; E05Y 2201/688; E05Y 2600/626; E05Y 2900/106

See application file for complete search history.

(56) References Cited

U.S. PATENT DOCUMENTS

| | | | |
|---|---|---|---|
| 1,747,206 | A | 2/1930 | Wilson |
| 2,239,273 | A | 4/1941 | Rowe et al. |
| 2,291,583 | A | 7/1942 | Rowe |
| 2,525,309 | A | 10/1950 | Norberg |
| 2,793,690 | A | 5/1957 | Stroup |

(Continued)

FOREIGN PATENT DOCUMENTS

| | | |
|---|---|---|
| CA | 2369899 | 10/2000 |

OTHER PUBLICATIONS

AMARR 3040 1" Polyurethane Door Bottom Bracket Installation Requirements, Jan. 2, 2019.

(Continued)

*Primary Examiner* — Beth A Stephan
(74) *Attorney, Agent, or Firm* — Wissing Miller LLP

(57) ABSTRACT

Disclosed is a bottom bracket assembly for a sectional door. Roller wheels engage with tracks along the sides of the doorway to support the door and guide it to move up and down or open and close the doorway. A lift cable connected with lift engagements may be provided to provide an upward bias to the motion of the door to offset the weight of the door. The roller wheels are supported by the bottom bracket assemblies connected at bottom portions of the edge stiles of the door. Each bottom bracket assembly has a bottom bracket fastened to the edge stile and a roller carrier that supports roller wheel. The connection between the roller carrier and the bottom bracket is adjustable to allow the wheel of the roller to be adjusted to a position outward of the edge of the door so that portions of the door, such as a lift bracket connected with the lift cable, do not interfere with the track.

14 Claims, 11 Drawing Sheets

(56) References Cited

U.S. PATENT DOCUMENTS

| | | | |
|---|---|---|---|
| 3,188,698 | A | 6/1965 | Zoll et al. |
| 3,213,924 | A | 10/1965 | Croswell |
| 3,376,913 | A | 4/1968 | Clapsaddle |
| 3,412,780 | A | 11/1968 | Moler |
| 3,484,812 | A | 12/1969 | Holland et al. |
| 4,986,099 | A | 1/1991 | Johnson et al. |
| 5,353,473 | A | 10/1994 | Sherick |
| 5,404,927 | A | 4/1995 | Bailey |
| 5,495,640 | A | 3/1996 | Mullet et al. |
| 5,508,691 | A | 4/1996 | Castleman |
| 5,522,446 | A | 6/1996 | Mullet et al. |
| 5,865,235 | A | 2/1999 | Krupke et al. |
| 5,918,660 | A | 7/1999 | Crawford, III et al. |
| 5,974,738 | A | 11/1999 | Jacobs |
| 6,082,430 | A | 7/2000 | Mock |
| 6,094,779 | A | 8/2000 | Young |
| 6,098,697 | A | 8/2000 | Krupke et al. |
| 6,112,464 | A | 9/2000 | Grisham et al. |
| 6,263,948 | B1 | 7/2001 | Whitley |
| 6,363,993 | B1 | 4/2002 | Aquilina |
| 6,401,793 | B1 | 6/2002 | Martin |
| 6,463,625 | B2 | 10/2002 | Mittag |
| 6,572,274 | B1 | 6/2003 | Margaliot et al. |
| 6,588,482 | B2 | 7/2003 | Wright |
| 6,615,898 | B2 | 9/2003 | Schulte |
| 6,742,564 | B2 | 6/2004 | Martin |
| 6,891,480 | B2 | 5/2005 | Williams et al. |
| 6,983,512 | B2 | 1/2006 | De Oliveira |
| 7,600,344 | B2 | 10/2009 | Michaud |
| 8,091,607 | B2 | 1/2012 | Aquilina |
| 9,546,511 | B2 * | 1/2017 | Dittmer ................. E05D 15/165 |
| 2006/0260247 | A1 | 11/2006 | Monteer |
| 2007/0044927 | A1 | 3/2007 | Mullet et al. |
| 2007/0200519 | A1 * | 8/2007 | Murphy ................ E05F 15/686 318/280 |
| 2007/0215293 | A1 | 9/2007 | Stone et al. |
| 2014/0041156 | A1 * | 2/2014 | Mascari ................ E05D 15/165 16/93 R |

OTHER PUBLICATIONS

161 Amarr Complete Commercial Installation Instructions, Jul. 2019.

* cited by examiner

OFFSET ROLLER CARRIER AND BOTTOM BRACKET ASSEMBLY

BACKGROUND

Field

The present disclosure relates to bottom brackets and roller carriers for sectional doors. In particular, the present disclosure is directed to roller carriers that can be conveniently adjusted to position the roller and track relative to a bottom bracket lift pin engagement so that the lift pin assembly and track do not interfere when the door is operated. The present disclosure also related to a bottom bracket including an integrated lift/step plate to facilitate closing the door without damaging the door.

Description of the Related Art

Sectional doors are used to cover openings in structures that open and close easily. For example, garage doorways are typically provided with sectional doors that can be raised and lowered to open and close the garage. Sectional doors include rollers positioned outward of the stiles along the side edges of the doors. Sets of rollers extend from the left and right edges of the door and engage, respectively, with left and right tracks along the sides of the doorway. The rollers and tracks support and guide the door as it is move up and down to open and close the doorway.

Each roller typically includes a roller wheel that resides in the track and a roller shaft that connects the wheel with a roller carrier assembly fixed to a stile along the edge of the door. In some sectional doors, the roller shaft extends through brackets fixed to the roller carrier assembly. Engagement of the roller shaft with the bracket fixes the axis of the shaft along a horizontal direction and supports the roller wheel so that it is aligned with the track. For known doors, when the door is installed, the distance the shaft extends from the bracket may need to be adjusted, for example, by placing spacers on the shaft, so that the edge of the door aligns with the opening of the doorway and so that the door is accurately engaged with the tracks. Such an adjustment may be cumbersome and may require supplying additional components, e.g., spacers.

Sectional doors typically include a mechanism to bias the door vertically to counterbalance the weight of the door. This bias may be adjusted to closely match the weight of the door so that opening the door does not require lifting the weight of the door itself. This vertical bias allows a person to lift the door easily. Where the door is provided with a motorized mechanism to open and close the door, the vertical bias reduces the amount of electrical power required to open the door. The vertical bias is typically provided by a spring, such as a torsion spring, that drives a reel or cable drum. A top end of a lift cable engages with the reel. A bottom end of the lift cable engages with a lift pin assembly positioned near the lower edge of the door. Lift pin assemblies may be provided at the bottom edge of the door at both the left and right sides of the door. When the door is moved downward to close the doorway, the cable is unwound from the reel, twisting the torsion spring to store mechanical energy. To open the door, vertical force is applied to the door causing the door to move upward. The stored tension in the spring drives the reel to wind the cable upward, facilitating opening of the door.

Engagement of the door with the doorway may include a weatherproof seal between the door and the doorway. Typically, a resilient gasket is provided along the edge of the doorway. When the door is in its downward position, this gasket is compressed between the door and the doorway. The door may also include a gasket along its bottom edge that compresses against the threshold of the doorway when the door is fully closed to seal the bottom of the doorway.

Compression of the gasket along the edge of the doorway is required only when the door is fully closed. As the door is being moved upward and downward with respect to the doorway, it is advantageous that the door does not engage with the gasket until it is fully or nearly fully closed. Positioning the door away from the gasket while it moves up and down reduces wear of the door and the gasket and allows the door to move more freely. Typically, the tracks along the sides of the doorway that engage with the rollers are arranged so that the face of the door is moved away from the jamb surrounding the doorway as the door moves upward from its downward-most position. The tracks maybe arranged at an angle away from the vertical. Roller carriers supporting the rollers may be configured so that as the rollers move upward along the tracks the face of the door moves inward and away from the jamb of the doorway. As the door moves downward to the closed position, the arrangement of rollers and tracks moves the door toward the inside face of the doorway. According to some known doors, the track is arranged so that the door moves about ⅛ inch away from the doorway for each vertical foot of upward motion.

When the face of the door moves away from the inside face or jamb of the doorway, the lift pin engagements at the bottom edge of the door likewise move inward with respect to the doorway and toward the track. A problem with known sectional doors is that the inward movement of the lift pin engagement may cause the lift pin engagement to contact the track, potentially damaging the track and/or the lift pin engagement. Typically, the position of the rollers on the door and the tracks connected with the doorway are selected so that the lift pin engagement is positioned inward of the track. Proper positioning of the rollers so that the lift pin engagement does not interfere with the track may be cumbersome for known sectional doors. For example, to properly align the tracks so that they are not contacted by the lift pin engagement, an installer may have to add spacers to the shafts of the rollers to move the roller wheels further in the outward direction from the edges of the door. This adjustment may be cumbersome. The position of the rollers with respect to the inside face of the doorway also depends, in part, on the thickness of the door itself. Sectional doors may come in a variety of thicknesses, further complicating the proper positioning of the roller to avoid interference between the lift pin engagement and the track.

Sectional doors are typically closed and locked by moving the door fully downward and extending one or more bolt locks on the door outward from the edges of the door to engage with openings in the tracks. To facilitate alignment of the bolt locks with the openings in the tracks, downward force may need to be applied to the door, for example, to compress a gasket along the bottom edge of the door with the threshold of the doorway and to overcome vertical bias applied by the lift cable and torsion spring. Known sectional doors may include a step plate that is fastened to a lower portion of the stile of the door. The step plate provides a surface for a person to apply downward force by stepping on the plate. The step plate may also serve as a lift handle, allowing a user to grasp the door and lift it upward to open the doorway. Providing a step plate may make installation of the door more complicated and require that extra parts that need to be supplied with the sectional door.

SUMMARY

The present disclosure relates to apparatuses and methods to address these and other difficulties.

According to one aspect of the disclosure, there is provided a bottom bracket for a sectional door that includes an integrated step plate.

According to another aspect of the disclosure, there is provided a bottom bracket for a sectional door including a roller carrier for receiving the shaft of a roller, where the wheel of the roller can be selectively positioned with respect to an edge of the door.

According to another aspect of the disclosure, there is provided a bottom bracket for a sectional door that includes a lift pin engagement that is integrated with the bottom bracket. According to a further aspect, the bottom bracket includes a roller carrier that can be adjusted so that the lift pin engagement travels up and down with the door and does not contact the track.

According to one embodiment a bottom bracket assembly for a sectional door is provided. The assembly comprises a bottom bracket adapted to be fixed to an edge stile of the door. The bottom bracket includes a platen adapted to be positioned along a face of the stile and a side member connected with the platen and adapted to be positioned along a side of the edge stile. A lift pin engagement is connected with the side member and extends a first distance in an outward direction from the side of the edge stile. A roller carrier including at least one receiver hole set adapted to receive a shaft of a roller through the receiver hole set is provided. The roller carrier is adjustably connected with the platen to position the roller carrier along the outward direction with respect to the bottom bracket. The connection of the roller carrier and the bottom bracket is adjusted along the outward direction so that when the roller is engaged with the roller carrier by the roller shaft received through the receiver hole set a wheel of the roller is positioned at a second distance in the outward direction from the side of the edge stile.

According to some embodiments, the second distance may be greater than the first distance. The roller wheel may be adapted to engage a lift track mounted along an edge of a doorway fitted with the sectional door. The bottom bracket assembly may further comprise a step plate integrally connected with the platen of bottom bracket. The bottom bracket assembly may further comprise a strut connected with the platen of the bottom bracket, wherein the step plate is positioned in an upward direction above the strut. A step plate bend may join the step plate with the platen. The roller carrier may comprise a plurality of receiver hole sets, wherein each receiver hole set is positioned a respective plurality of engagement distances from the platen, and wherein each of the plurality of engagement distances corresponds with a respective one of a plurality of track sizes. The side member may be formed integrally with the face plate. A side member bend may join the side plate with the platen. The roller may further comprise a shoulder along the roller shaft, wherein the shoulder contacts an outward surface of the roller carrier to position the wheel at the second distance. The roller carrier may comprise a connection plate and two wing plates, wherein the wing plates extend perpendicularly from the connection plate, wherein the connection plate adjustably connects with the platen, and wherein the receiver hole set comprises holes on each wing plate aligned along the outward direction. The connection plate may be formed integrally with the wing plates. Wing plate bends may join the connection plate with the wing plates. The connection plate may further comprise a plurality of through holes elongated along the outward direction, wherein fasteners connect the connection plate to the platen and wherein the positions of the fasteners along the elongated through holes adjusts the roller carrier with respect to the bottom bracket in the outward direction.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
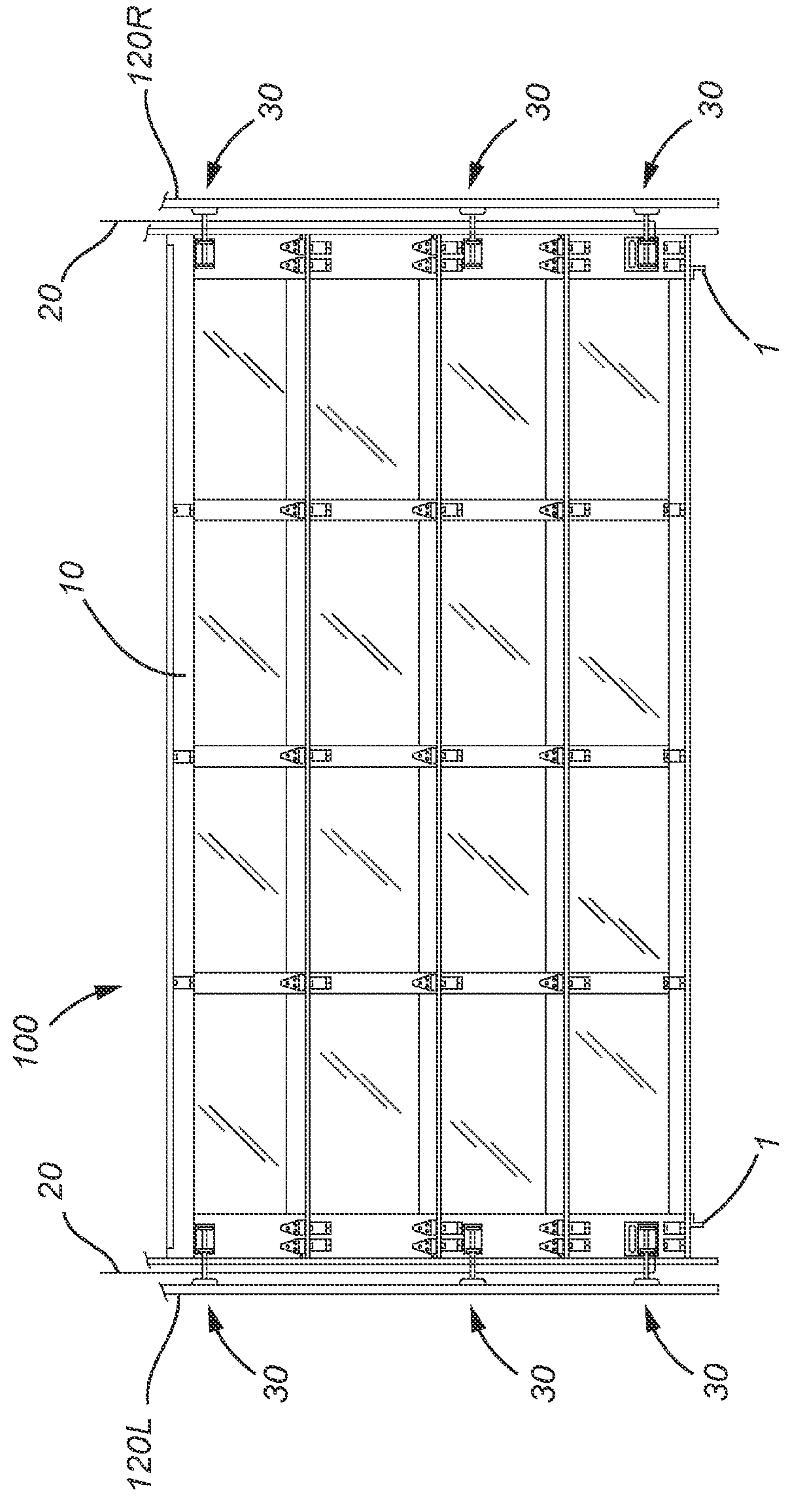
FIG. 1 is an elevational view of a sectional door including a bottom bracket according to an embodiment of the disclosure.

FIG. 1 is an elevation view of a sectional door 10 positioned in a doorway 100 according to an embodiment of the disclosure. Along the sides of doorway 100 are tracks 120L, 120R. The tracks are mounted to walls of the structure including doorway 100. Lift cables 20 are provided along the sides of the door 10. The top ends of cables 20 are connected with a lift mechanism such as a reel or cable drum and torsion spring (not shown) that provides an upwardly directed force on the cables. As described below, the lower ends of cables 20 are connected with a lower edge of the door. Tension applied to cables 20 offsets the weight of door 10 to ease opening the door and to allow the door to be safely closed.

Bottom bracket assemblies 1 according to embodiment of the disclosure are provided at each side of the door near the bottom edge. Rollers 30 extend from the sides of door 10. Rollers engage with tracks 120L, 120R to support and guide door 10 as it is raised and lowered to open and close doorway 100.

Figure 2A:
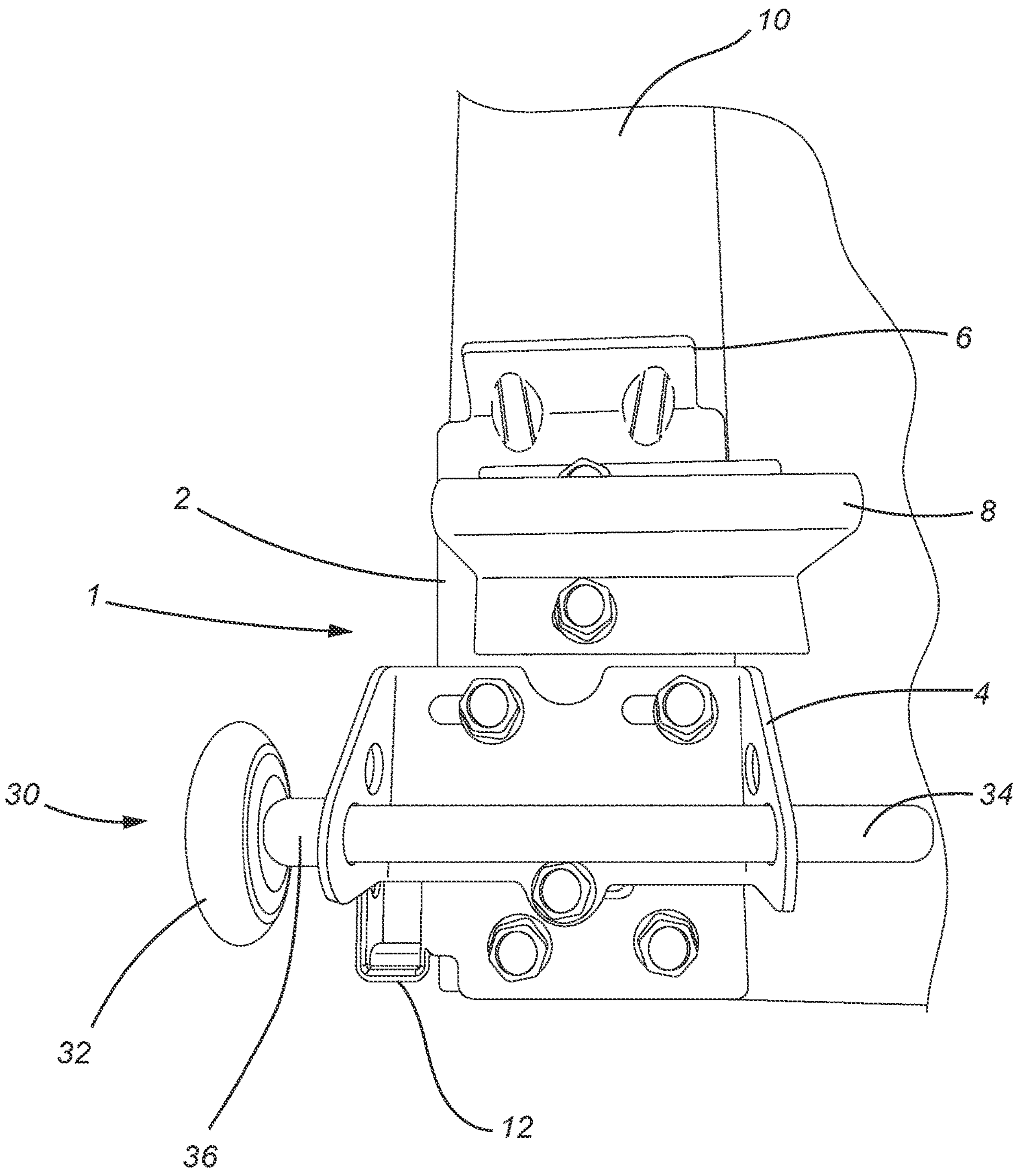
FIG. 2A is a perspective view of a bottom bracket assembly according to an embodiment of the disclosure supporting a roller and connected with an edge of the sectional door of FIG. 1.
Figure 2B:
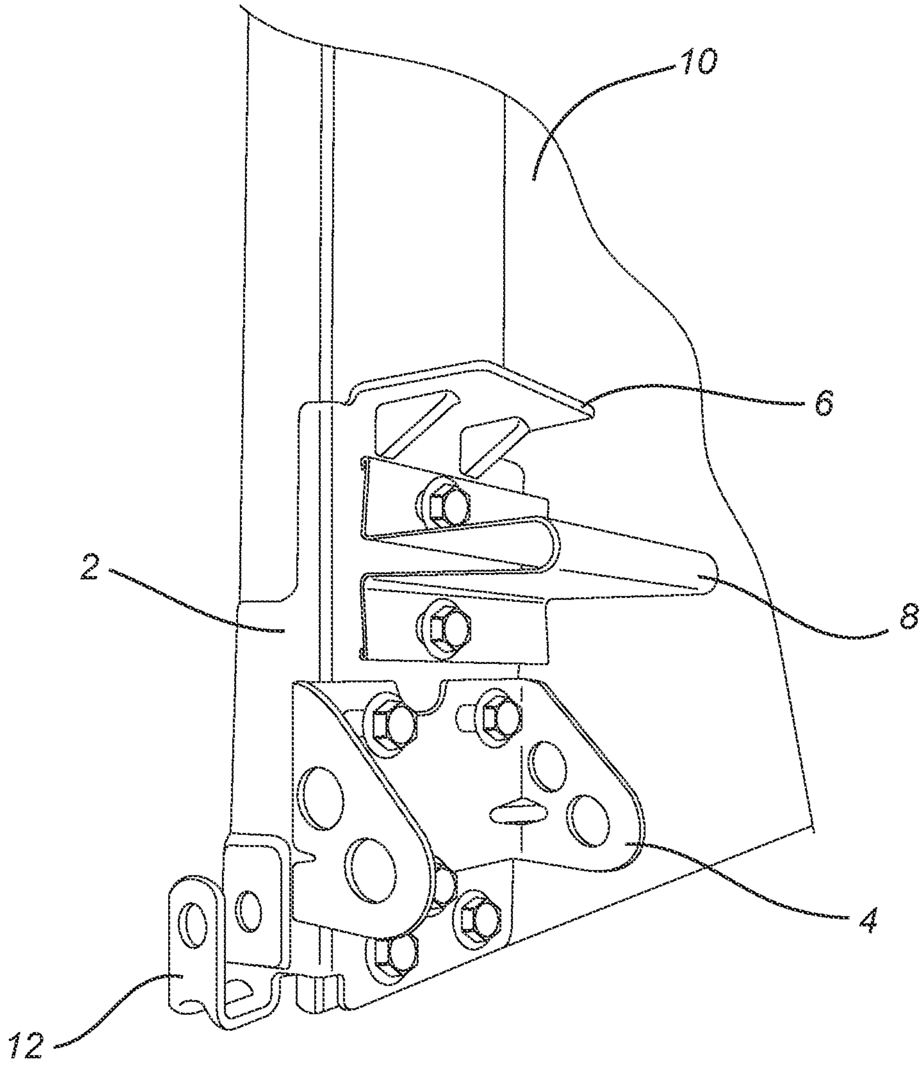
FIG. 2B is a perspective view of the bottom bracket assembly of FIG. 2A without the roller.

FIG. 2A is a detailed view of a bottom bracket assembly 1 according to an embodiment of the disclosure. Bottom bracket assembly 1 is fixed to an edge stile of door 10. Roller 30 is supported by carrier 4 with wheel 32 of roller 30 positioned outward from the edge of the door. FIG. 2B is another view of the bottom bracket assembly 1 without roller 30 for clarity of presentation.

In some embodiments, strut 8 is connected with bottom bracket 2 and door 10. In these embodiments, one or more struts 8 are fixed with sections of door 10 and run horizontally across the width of the door. Struts 8 may make the door more resistant to forces imposed on the surface of the door, for example, from strong winds or a pressure differential that may develop across the door during a storm event. In the embodiment shown in FIGS. 2A and 2B, strut 8 is formed as a U-shaped or T-shaped member that provides a high mechanical moment of inertia to resist deflection of the door in the direction into or out from doorway 100.

Figure 3A:
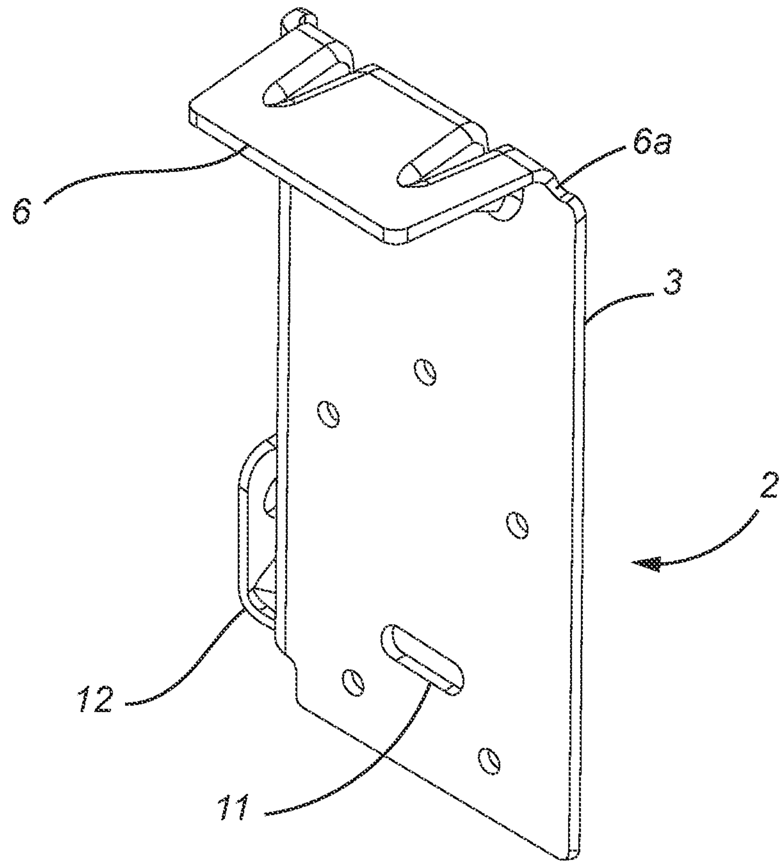
FIG. 3A is a perspective view of the bottom bracket of the bottom bracket assembly of FIG. 2A.
Figure 3B:
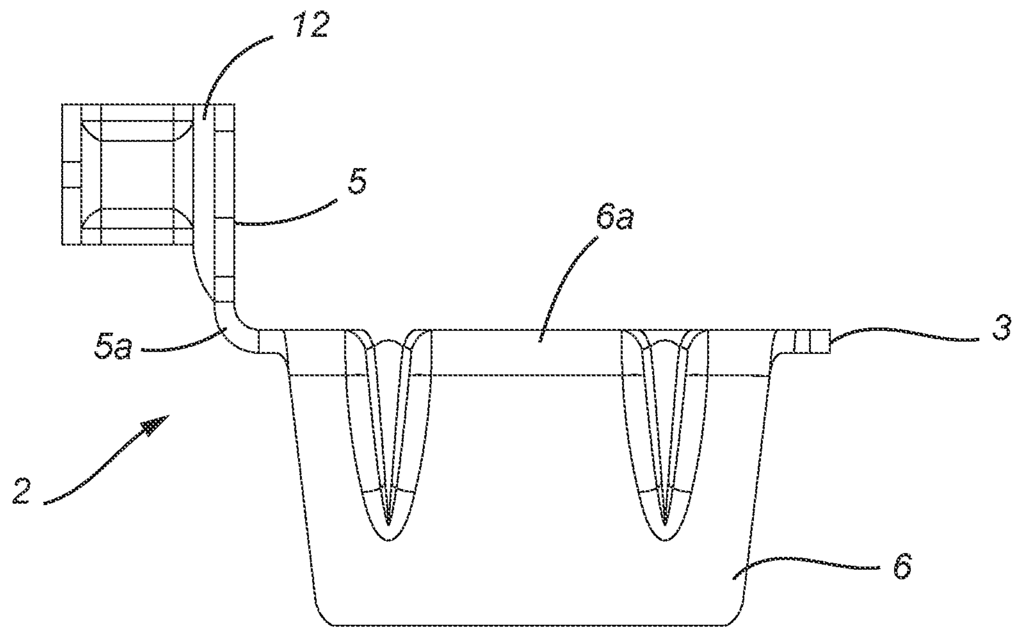
FIG. 3B is a top view of the bottom bracket of FIG. 3A.
Figure 3C:
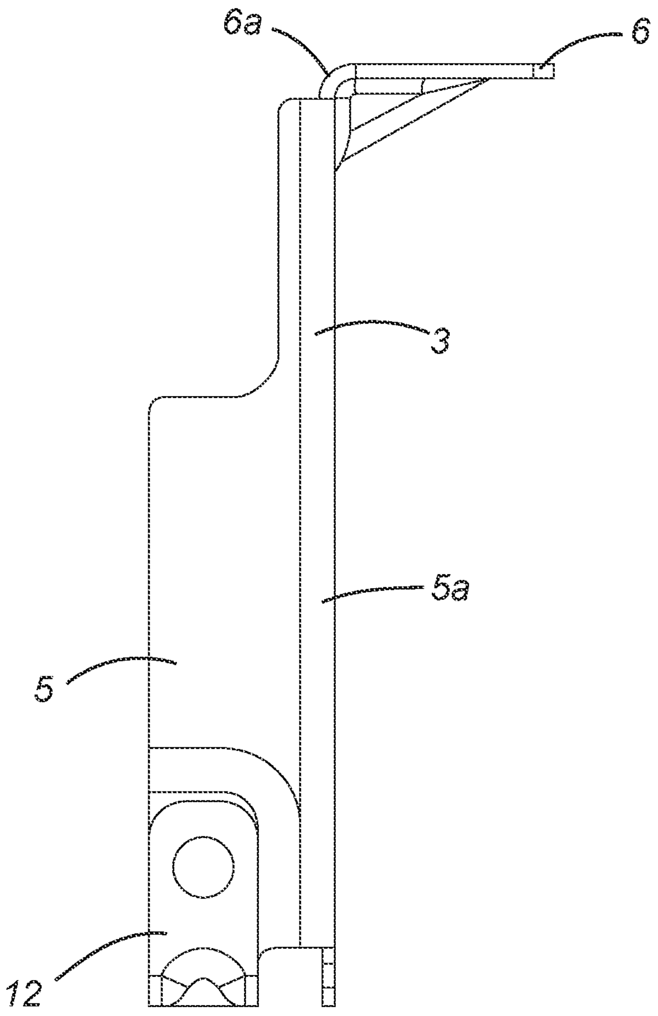
FIG. 3C is a side view of the bottom bracket of FIG. 3A.

Bottom bracket assembly 1 includes a bottom bracket 2 fixed to the edge stile of door 10. FIGS. 3A, 3B, and 3C are a perspective view, a top view and a side view, respectively, of bottom bracket 2. Bottom bracket 2 includes a platen 3 adapted to connect with the inside face of door 10. Step plate 6 extends away from platen 3 at a top edge of the platen. When bracket 2 is connected with door 10, step plate 6 extends from the inside face of door 10. Step plate 6 allows a user to press down on door 10 to force the door into its downwardmost position to facilitate closing and locking the door. According to some embodiments step plate 6 also forms a lift handle that allows a user to grasp the door 10 and pull it upward to open the doorway 100. According to some embodiments, step plate 6 is created by bending a portion of the material forming bottom bracket 6 away from the plane of platen 3 or by stamping bottom bracket, including step plate 6 from a single sheet of material so that step plate 6 is joined with platen 3 by a step plate bend 6*a*. This provides a step plate 6 that is securely fixed with bracket 2 without requiring a separate plate to be installed on door 10. This may simplify installation of the door. According to the embodiment shown in FIG. 2A, step plate 6 is provided above strut 8. This arrangement may encourage users to use the conveniently positioned step plate 6 to force the door downward to close it and may reduce the chance that a user will step on the strut to close the door. Struts for sectional doors are typically formed from relatively thin metal sheets, for example, 20-gauge steel. Stepping on the strut to close the door may damage the strut.

Side member 5 extends from a side edge of platen 3. According to some embodiments, side member 5 is created by bending a portion of the material forming bottom bracket 2 away from the plane of platen 3 or by stamping bottom bracket, including side member 5 from a single sheet of material so that side member 5 is joined with platen 3 by a side member bend 5*a*. When bracket 2 is connected with door 10, side member 5 extends along the edge of the door. Lift pin assembly 12 is connected with side member 5. Lift cable 20, as shown in FIG. 1 is connected with engagement 12 by a pin inserted through aligned holes in engagement 12.

As shown in FIG. 3A, a number of through holes are provided through bottom bracket 2 to fix bracket 2 with door 10. These including include elongated hole 11, that which provides a mechanism for adjustably fixing roller carrier 4 to bracket 2 and door 10, as will be explained below.

Figure 4:
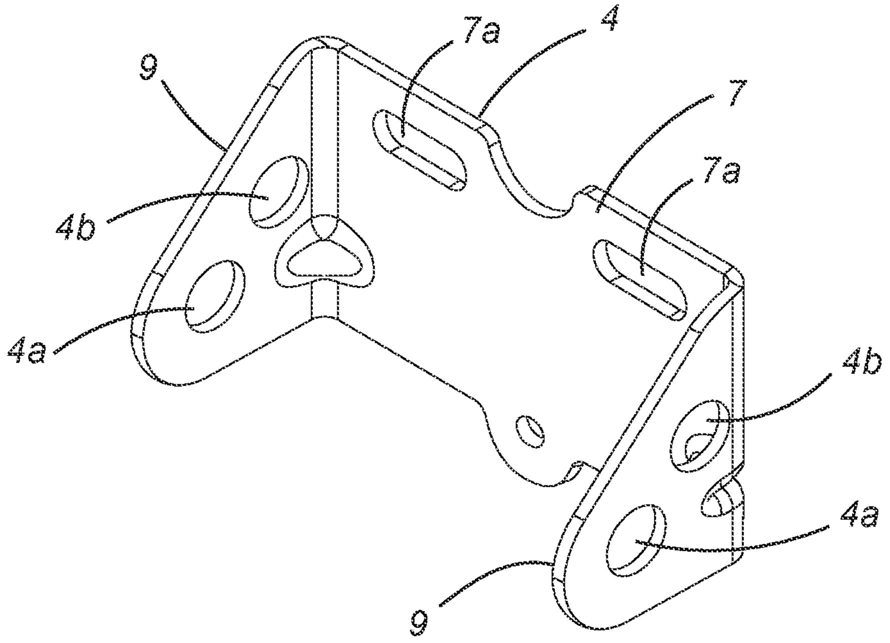
FIG. 4 is a perspective view of the roller carrier of the bottom bracket assembly of FIG. 2A.

FIG. 4 shows roller carrier 4. Carrier 4 includes a connection plate 7 and two parallel wing plates 9 that extend from connection plate 7. Connection plate 7 includes elongated holes 7*a*. Wing plates 9 each include one or more roller receiving holes 4*a*, 4*b*. Receiving holes 4*a*, 4*b* are arranged so that the shaft 34 of roller 30 can be fitted through both wing plates 9 to hold the roller in a fixed orientation with respect to carrier 4. The position of holes 4*a*, 4*b* with respect to connection plate 7 determines how far the axis of roller 30 will be positioned from the inside surface of door 10. When the door 10 is installed in a doorway 100, the axis of the rollers 30 is aligned with the center-line of track 120L, 120R. The position of the center-line of the track relative to the inside face of the doorway depends on the track size. Typically, track sizes range from 1 inch to 4 inch, and may be larger. For installations where door 10 is subject to high wind forces, for example, in hurricane-prone regions, a larger, more robust track size may be used. Where a less robust door is sufficient, a narrower, less expensive track size may be used. The same roller carrier 4 can be used to support rollers 30 to engage with various tracks of various sizes by engaging the rollers with selected sets of holes 4*a*, 4*b*. As a result, a bottom bracket assembly according to embodiments of the disclosure can be used to support doors designed for different situations. This may reduce the number of parts that need to be inventoried for different configurations of the door.

Figure 5:
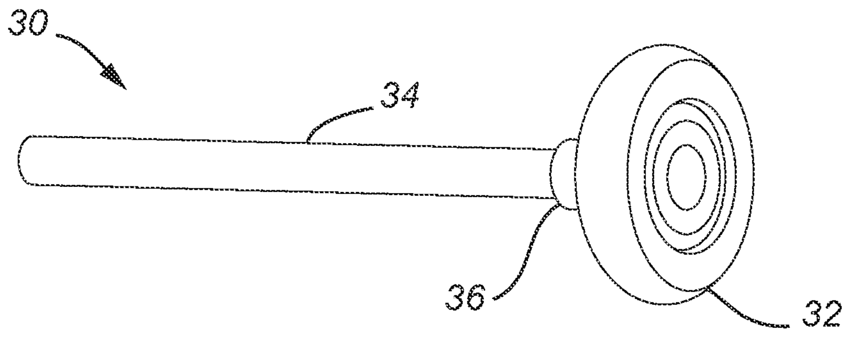
FIG. 5 is a perspective view of a roller that engages with the bottom bracket assembly of FIG. 2A.

FIG. 5 is a perspective view of a roller 30 that may be used with bottom bracket assemblies according to embodiments of the disclosure. Roller 30 has a roller shaft 34 connected with a wheel 32. A low friction bearing may be provided between shaft 34 and wheel 32 to facilitate rotation of the wheel with respect to the shaft. A locating shoulder 36 is provided on the shaft 34. As shown in FIG. 2A, when shaft 34 is inserted through holes 4*a*, 4*b* of roller carrier 4, shoulder 36 presses against wing 9 of carrier 4 so that wheel 32 is held a fixed distance from the carrier. Roller 30 may be a commercial product with the dimensions of the wheel, shaft, and shoulder conforming to industry standards. Using such standard parts reduces the cost to install a door and to repair and maintain the door by replacing rollers when they become worn. By providing a roller carrier according to embodiments of the disclosure, which can be easily adjusted, standard rollers can be used without modification, e.g., without having to add spacers to the shaft of the roller to adjust the position of the wheel outward from the edge of the door.

Figure 6A:
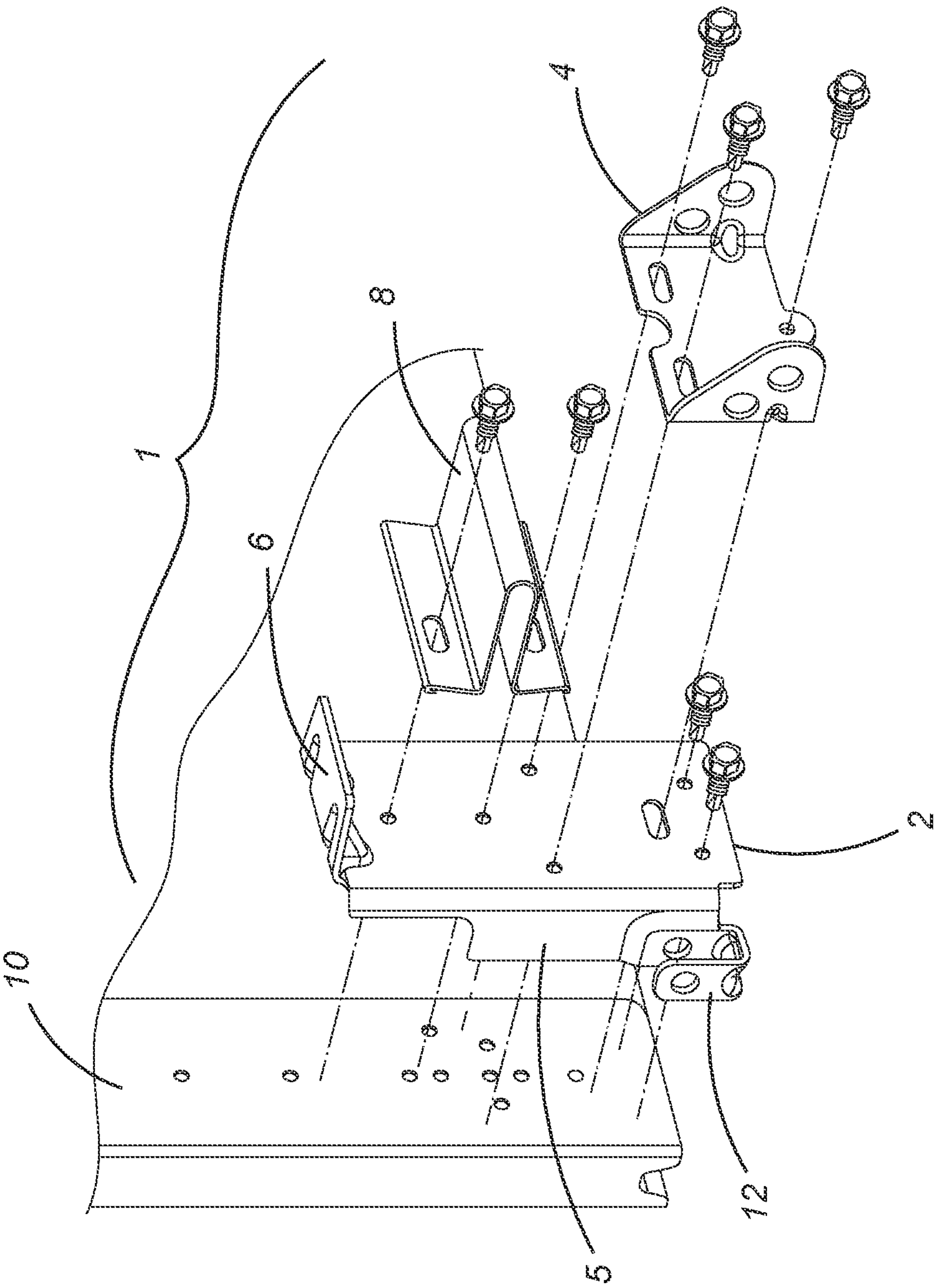
FIG. 6A is an exploded view of the bottom bracket assembly of FIG. 2A.
Figure 6B:
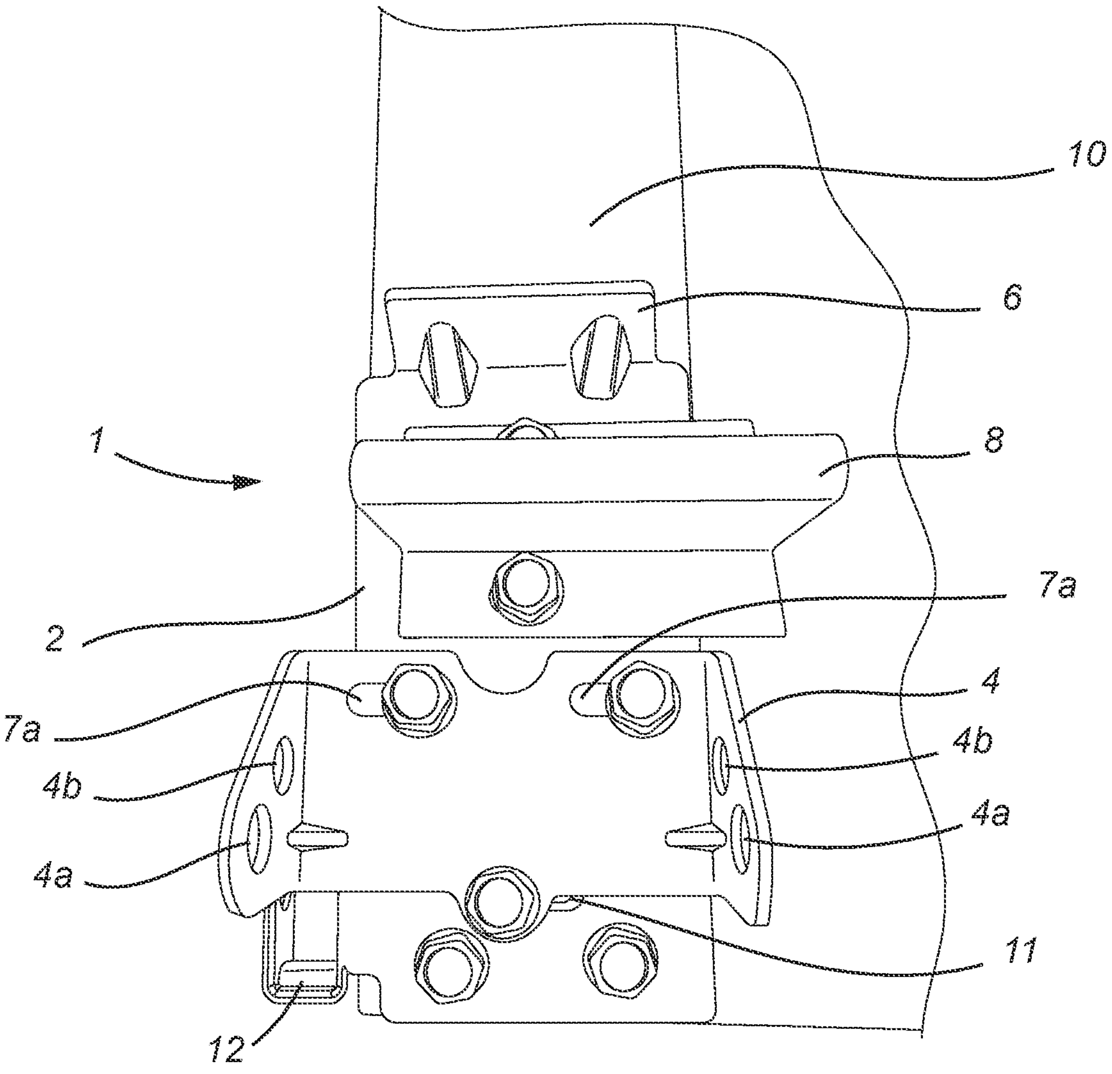
FIG. 6B is another perspective view of the bottom bracket assembly of FIG. 2A without the roller.

FIG. 6A shows an exploded view of bottom bracket assembly 1. Bottom bracket 2 is fixed to an edge stile of door 10. Side members 5 extend along the edge of the door. Lift engagement 12 is positioned near the bottom edge of the door. Fasteners extend through holes in bottom bracket 2, roller carrier 4, and strut 8 to fix bottom bracket assembly 1 to door 10. FIG. 6B shows the bottom bracket assembly 1 assembled as illustrated in FIG. 6A. As shown in FIG. 2A, roller shaft 34 is inserted through selected holes 4*a*, 4*b* in roller carrier 4. Shoulder 36 contacts the side of roller carrier 4 at the edge of the selected hole 4*a*, 4*b*.

Figure 6C:
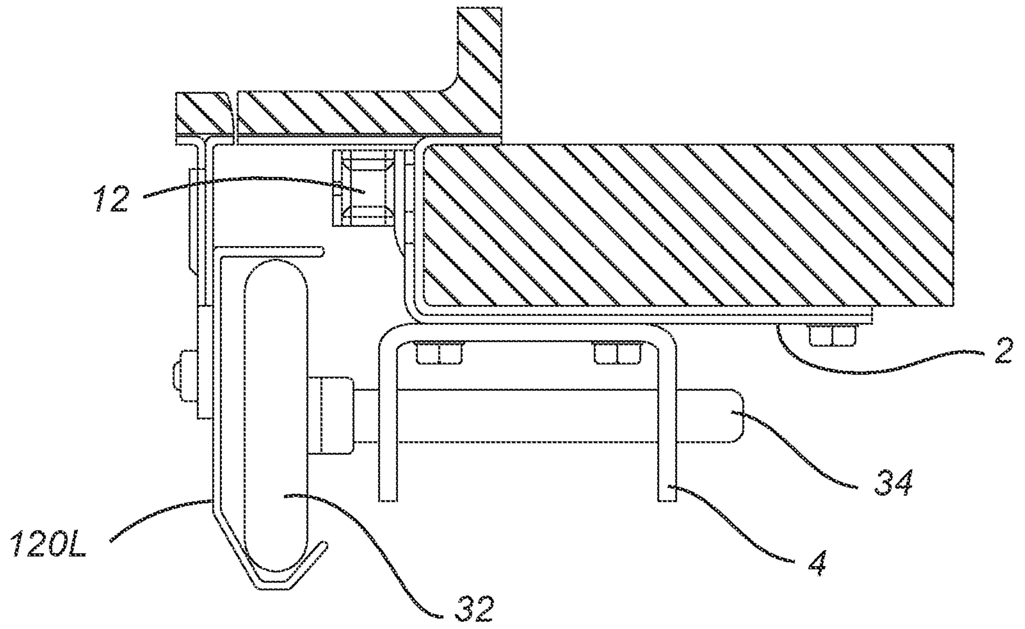
FIG. 6C is a top view of the bottom bracket assembly of FIG. 2A installed on a sectional door.

Elongated holes 7*a* in carrier 4, and elongated hole 11 in bottom bracket 2 allow the position of carrier 4, and hence the position of roller wheel 32, to be adjusted to select the distance of the wheel from the edge of the door so that the wheel 36 is aligned with the position of track 120L, 120R fixed near the inside edges of doorway 100. This adjustment allows tracks 120L 120R to be positioned away from the edge of door 10 so that lift cable 20 and lift engagements 12 do not interfere with tracks 120L, 120R. As shown in FIG. 6C, by adjusting roller carrier 4 relative to bracket 2, roller wheel 32 and track 120L are positioned outward from the edge of the door a distance sufficient that lift engagement 12 does not interfere with track 120L. As discussed above, tracks 120L, 120R are angled away from the inside face of doorway 100 so that, as the door moves upward, the door moves inward, away from the jamb of the doorway. This motion allows the door 10 to break contact with doorway and with the weatherproofing gasket provided to seal door 10 with doorway 100 when the door is opened. If the tracks 120L, 120R are located too close to the edge of door 10, when the door moves inward as it rises, lift pin engagement 12 or cable 20 could contact the track, potentially damaging the track, cable, or the pin engagement. A bottom bracket assembly 1 according to embodiments of the disclosure avoids this problem by allowing an installer to adjust the distance of wheel 32 with respect to the door 10 by sliding roller carrier 4 with respect to bottom bracket 2 before tightening fasteners inserted through elongated holes 7*a*, 11.

According to one embodiment bottom bracket assemblies 1 are installed on a door 10 as follows. Bottom bracket 2 is fitted to the stile on a first side of the door 10 with side member 5 positioned against the edge of the stile and the bottom edge of bottom bracket 2 aligned with the bottom edge of the stile. Fasteners, such as self-drilling Tek screws, are driven through the lowermost holes in bracket 2 and into the stile to fix the bracket to the stile.

Roller carrier 4 is positioned so that elongated holes 7*a* on the carrier align with holes in the middle of bracket 2 (as shown in the embodiment of FIG. 6A) and the lowermost hole in carrier 4 aligns with elongated hole 11 in bracket 2. Fasteners are partially driven through the elongated holes 7*a* in carrier 4. The fasteners are left loose enough to allow carrier 4 to move side-to-side.

Roller 30 is installed by inserting shaft 34 of the roller 30 through a selected set of receiving holes 4*a*, 4*b*. The set of receiving holes 4*a*, 4*b* is selected based on the size of wheel 32 (and hence, the track size of tracks 120L, 120R). According to one embodiment, where a two-inch track size is used, the innermost receiving holes 4*a* are selected and where a three-inch track size is used, the outermost set of receiving holes 4*b* are selected.

The horizontal position of carrier 4, and hence roller wheel 32 with respect to the edge of door 10, is adjusted to correspond with the desired location of track 120L, 120R with respect to the doorway 100. Elongated holes 7*a* allow carrier 4 to move horizontally. The position of the wheel, and hence, track 120L, 120R with respect to the edge of the door 10 and the lift engagement 12 is selected as shown in FIG. 6C so that the lift engagement 12 does not interfere with the track when the door is raised and lowered. Once the horizontal position wheel 32 is correct, fasteners in holes 7*a* are tightened. Another fastener is inserted through the hole in carrier 4 aligned with elongated hole 11 in bracket 2 and tightened to fix the position of roller carrier 4 with respect to the door 10.

This same procedure is repeated to install a bottom bracket assembly 1 on the stile on the opposite side of the door 10. According to some embodiments, once bottom bracket assemblies 1 are installed, a strut 8 is connected with the assemblies 1, as shown in FIG. 6A.

While illustrative embodiments of the disclosure have been described and illustrated above, it should be understood that these are exemplary of the disclosure and are not to be considered as limiting. Additions, deletions, substitutions, and other modifications can be made without departing from the spirit or scope of the disclosure. Accordingly, the disclosure is not to be considered as limited by the foregoing description.

We claim:

1. A bottom bracket assembly for a sectional door comprising:

a bottom bracket adapted to be fixed to an edge stile of the door, the bottom bracket including a platen adapted to be positioned along a face of the stile and a side member connected with the platen and adapted to be positioned along a side of the edge stile;

a lift pin engagement connected with the side member and extending a first distance in an outward direction from the side of the edge stile;

a roller carrier including at least one receiver hole set adapted to receive a shaft of a roller through the receiver hole set, wherein the roller carrier is adjustably fixed with the platen to position the roller carrier along the outward direction with respect to the bottom bracket, wherein the connection of the roller carrier and the bottom bracket is adjusted along the outward direction, wherein the roller carrier is adapted to be fixed from any movement at multiple positions with respect to the bottom bracket along the outward direction, and wherein, when the roller is engaged with the roller carrier by the roller shaft received through the receiver hole set and the roller carrier is fixed from any movement at a selected position of the multiple positions, a wheel of the roller is positioned at a second distance in the outward direction from the side of the edge stile.

2. The bottom bracket assembly of claim 1, wherein the second distance is greater than the first distance.

3. The bottom bracket assembly of claim 1, wherein the roller wheel is adapted to engage a lift track mounted along an edge of a doorway fitted with the sectional door.

4. The bottom bracket assembly of claim 1, further comprising a step plate integrally connected with the platen of the bottom bracket.

5. The bottom bracket assembly of claim 4, further comprising a strut connected with the platen of the bottom bracket, wherein the step plate is positioned in an upward direction above the strut.

6. The bottom bracket assembly of claim 4, further comprising a step plate bend joining the step plate with the platen.

7. The bottom bracket assembly of claim 1, wherein the roller carrier comprises a plurality of receiver hole sets, wherein each of the receiver hole sets is positioned a respective plurality of engagement distances from the platen, and wherein each of the plurality of engagement distances corresponds with a respective one of a plurality of track sizes.

8. The bottom bracket assembly of claim 1, wherein the side member is formed integrally with the platen.

9. The bottom bracket assembly of claim 8, further comprising a side member bend joining the side member with the platen.

10. The bottom bracket assembly of claim 1, wherein the roller further comprises a shoulder along the roller shaft, wherein the shoulder contacts an outward surface of the roller carrier to position the wheel at the second distance.

11. The bottom bracket assembly of claim 1, wherein the roller carrier comprises a connection plate and two wing plates, wherein the wing plates extend perpendicularly from the connection plate, wherein the connection plate adjustably connects with the platen, and wherein the receiver hole set comprises holes on each of the wing plates aligned along the outward direction.

12. The bottom bracket assembly of claim 11, wherein the connection plate is formed integrally with the wing plates.

13. The bottom bracket assembly of claim 12, further comprising respective wing plate bends joining the connection plate with the wing plates.

14. The bottom bracket assembly of claim 12, wherein the connection plate further comprises a plurality of through holes elongated along the outward direction, wherein fasteners connect the connection plate to the platen and wherein the positions of the fasteners along the elongated through holes adjusts the roller carrier with respect to the bottom bracket to fix the roller carrier from any movement at a one of the multiple positions in the outward direction.

* * * * *